(12) United States Patent
Lam (10) Patent No.: US 10,122,169 B2
(45) Date of Patent: Nov. 6, 2018

(54) POWER MANAGEMENT DEVICES AND KITS INCLUDING THE SAME

(71) Applicant: QML, LLC, Elkridge, MD (US)

(72) Inventor: Qui Moc Lam, Elkridge, MD (US)

(73) Assignee: QML, LLC, Elkridge, MD (US)

( * ) Notice: Subject to any disclaimer, the term of this patent is extended or adjusted under 35 U.S.C. 154(b) by 0 days.

(21) Appl. No.: 15/125,962

(22) PCT Filed: Mar. 19, 2015

(86) PCT No.: PCT/US2015/021391
§ 371 (c)(1),
(2) Date: Sep. 13, 2016

(87) PCT Pub. No.: WO2015/143110
PCT Pub. Date: Sep. 24, 2015

(65) Prior Publication Data
US 2017/0179724 A1 Jun. 22, 2017

Related U.S. Application Data

(60) Provisional application No. 61/955,329, filed on Mar. 19, 2014.

(51) Int. Cl.
*H02J 1/00* (2006.01)
*H02J 3/00* (2006.01)
(Continued)

(52) U.S. Cl.
CPC ............. *H02J 3/005* (2013.01); *H02J 3/382* (2013.01); *H02J 3/383* (2013.01); *H02M 7/44* (2013.01);
(Continued)

(58) Field of Classification Search
CPC .. H02J 9/061; H02J 3/382; H02J 3/005; H02J 9/062; Y10T 307/625
See application file for complete search history.

(56) References Cited

U.S. PATENT DOCUMENTS 3,814,544 A * 6/1974 Roberts ................. F04B 49/025
417/40
4,547,771 A * 10/1985 Rockwood ........... G08B 21/182
340/591

(Continued)

OTHER PUBLICATIONS

PROwatt 2500 power inverter Product Features, Manual. [online] 2000. [retrieved on May 27, 2015]. Retrieved from the internet: <URL:http://www.e-d-c.com/linecard/statpower/pw2500.htm>.

(Continued)

*Primary Examiner* — Rexford Barnie
*Assistant Examiner* — Rasem Mourad
(74) *Attorney, Agent, or Firm* — Gianna J. Arnold; Saul Ewing Arnstein & Lehr LLP (57) ABSTRACT

The present invention provides a power management device. In one embodiment, the device includes: a line power input; a line power output; an inverter in communication with one or more DC power sources, the inverter adapted and configured to receive DC power from a DC power source and output line power; a DC transformer in communication with the line power input, the DC transformer adapted and configured to change line power to DC power; a first relay; a second relay; and a third relay. If line power is provided via the line power input: the first relay is adapted and configured to electrically couple the line power input to the line power output; the second relay is adapted to deactivate the inverter; and the third relay is adapted to electrically couple the DC transformer to the one or more DC power sources.

17 Claims, 5 Drawing Sheets

(51) Int. Cl.
  *H02J 3/38* (2006.01)
  *H02M 7/44* (2006.01)
  *H02J 9/06* (2006.01)
  *H02J 9/00* (2006.01)

(52) U.S. Cl.
  CPC ............. *H02J 9/00* (2013.01); *H02J 9/061* (2013.01); *H02J 9/062* (2013.01)

(56) References Cited

U.S. PATENT DOCUMENTS

| | | | | |
|---|---|---|---|---|
| 5,322,449 | A * | 6/1994 | Pizano | H01R 31/06 439/222 |
| 5,458,991 | A * | 10/1995 | Severinsky | H01M 10/48 307/66 |
| 5,579,197 | A * | 11/1996 | Mengelt | H02J 9/062 307/66 |
| 5,592,074 | A * | 1/1997 | Takehara | H02J 5/00 136/293 |
| 5,616,968 | A | 4/1997 | Fujii et al. | |
| 5,834,858 | A * | 11/1998 | Crosman, III | H02J 7/0068 307/66 |
| 6,188,200 | B1 * | 2/2001 | Maiorano | H02J 3/005 320/132 |
| 6,343,752 | B1 * | 2/2002 | Sleasman | E03F 5/22 241/101.3 |
| 6,369,463 | B1 * | 4/2002 | Maiorano | H02J 9/00 307/66 |
| 2010/0226160 | A1 | 9/2010 | Prior et al. | |
| 2012/0137466 | A1 * | 6/2012 | Duncan | A47L 9/00 15/323 |
| 2014/0062192 | A1 | 3/2014 | Vichnyakov | |
| 2014/0116492 | A1 * | 5/2014 | Estes | H01L 31/02021 136/244 |

OTHER PUBLICATIONS

Communication—Extended European Search Report, European Patent Application No. 15764927.8, dated Nov. 7, 2017.
International Search Report and Written Opinion, International Patent Application No. PCT/US2015/021391, dated Jun. 24, 2015.

* cited by examiner

POWER MANAGEMENT DEVICES AND KITS INCLUDING THE SAME

CROSS REFERENCE TO RELATED APPLICATIONS

This application claims the priority of PCT/US2015/021391, filed on Mar. 19, 2015, which claims priority to U.S. Provisional Patent Application No. 61/955,329, filed on Mar. 19, 2014, the entire contents of each of which are hereby incorporated in total by reference.

BACKGROUND

Many structures are dependent on sump pumps to maintain dry basements. However, the same rain storms that threaten basement flooding can also cause power interruptions that render traditional line-voltage-powered sump pumps useless. As a result, sump pump users frequently incur the expense of purchasing and installing a second, back-up sump pump using an alternative energy source. However, such back-up sump pumps often have limited pumping rates relative to primary sump pumps.

SUMMARY OF THE INVENTION

It is an object of the invention to provide a power management device including: a line power input; a line power output; an inverter in communication with one or more DC power sources, the inverter adapted and configured to receive DC power from a DC power source and output line power; a DC transformer in communication with the line power input, the DC transformer adapted and configured to change line power to DC power; a first relay; a second relay; and a third relay. If line power is provided via the line power input: the first relay is adapted and configured to electrically couple the line power input to the line power output; the second relay is adapted to deactivate the inverter; and the third relay is adapted to electrically couple the DC transformer to the one or more DC power sources. If line power is not provided via the line power input: the first relay is adapted and configured to electrically couple the inverter to the line power output; the second relay is adapted to activate the inverter; and the third relay is adapted to disconnect the DC transformer from the one or more DC power sources.

This object of the invention can have a variety of embodiments. The line power input can include a plug adapted and configured for removable coupling with an electrical receptacle. The plug can be NEMA-compliant. The plug can be a NEMA 5-15 grounded plug. The line power input can include an appliance coupler or an interconnection coupler. The appliance coupler or the interconnection coupler can be IEC-60320-compliant. The line power output can be an electrical receptacle. The electrical receptacle can be NEMA-compliant. The electrical receptacle can be a NEMA 5-15 grounded receptacle.

The power management device can further include a housing. The housing can have a profile substantially approximating a one-gang electrical box.

The inverter can be a 2,000 Watt continuous, 4,000 Watt peak inverter.

The one or more DC power sources can include one or more batteries. The one or more batteries can be 12 Volt batteries.

The one or more DC power sources can include one or more selected from the group consisting of: flywheels, solar cells, and fuel cells.

The line power can be 120 Volt.

It is a further object of the present invention to provide a kit including the power management device as described herein and one or more DC power sources.

This object of the invention can have a variety of embodiments. The one or more DC power sources can include one or more batteries. The one or more batteries can be 12 Volt batteries. The one or more DC power sources can include one or more selected from the group consisting of: flywheels, solar cells, and fuel cells.

The kit can further include a sump pump. The power management device can further include a first timer programmed to periodically interrupt a flow of electricity from the line power input. The power management device can further include: a second timer programmed to periodically cause the sump pump to run regardless of whether a float switch is triggered; and a sensor programmed to detect whether vibrations indicative of operation of the sump pump occur. The power management device can further include an alarm programmed to generate an alert if the sensor does not detect vibrations when the second timer periodically causes the sump pump to run.

The kit can further include one or more pumps selected from the group consisting of: waste water pumps and booster pumps.

The kit can further include one or more appliances selected from the group consisting of: refrigerators, freezers, and HVAC units.

These and other objects are achieved in the present invention as illustrated herein.

There has thus been outlined, rather broadly, features of the invention in order that the detailed description thereof that follows may be better understood, and in order that the present contribution to the art may be better appreciated. There are, of course, additional features of the invention that will be described further hereinafter, indeed, it is to be understood that both the foregoing general description and the following detailed description are exemplary and explanatory and are intended to provide further explanation of the invention as claimed.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other embodiments for carrying out the several purposes of the present invention. It is important, therefore, that equivalent constructions insofar as they do not depart from the spirit and scope of the present invention, are included in the present invention.

DESCRIPTION OF THE FIGURES

For a fuller understanding of the nature and desired objects of the present invention, reference is made to the following detailed description taken in conjunction with the figures wherein.

DEFINITIONS

The instant invention is most clearly understood with reference to the following definitions:

As used in the specification and claims, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, as used herein, the term "or" is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION

Aspects of the invention provide power management devices and kits. Such devices and kits provide uninterruptible power to devices including, but not limited to, sump pumps, waste water pumps, booster pumps, refrigerators, freezers, HVAC units, and the like.

Figure 1:
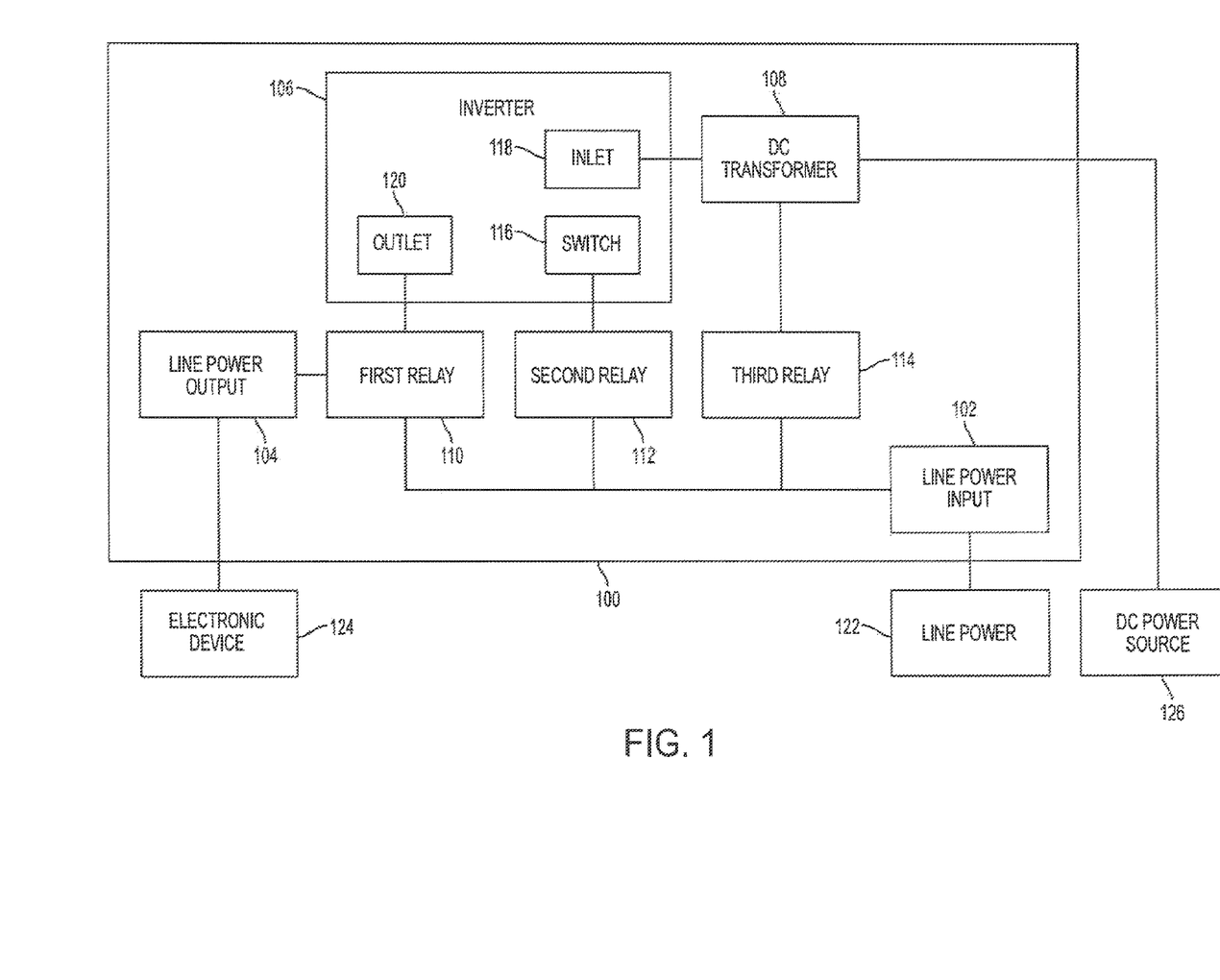
FIG. 1 depicts a power management device 100 including a line power input 102, a line power output 104, an inverter 106, a DC transformer 108, a first relay 110, a second relay 112, and a third relay 114 according to an embodiment of the invention.

Referring now to FIG. 1, a power management device 100 includes a line power input 102, a line power output 104, an inverter 106, a DC transformer 108, a first relay 110, a second relay 112, and a third relay 114.

Line power input 102 can be any device capable of interfacing with a line power source 122 (also known as mains electricity). For example, the line power input 102 can be a plug, such as a male plug. Various plug formats exist in different countries and for different voltages. Within North America, the National Electrical Manufacturers Association of Arlington, Va. defines standards for various electrical connectors. For example, the most common outlet in the United States provides 120V, 15 Amp service. In other embodiments, line power input 102 is one or more wires that can be hard-wired into an electrical box.

Likewise, line power output 104 can be any device capable of interfacing with an electronic device 124. Preferably, line power output 104 can has a similar format to the line power source 122 in the environment in which the device 100 will be installed. For example, the line power output 104 can be a female electrical connector such as a NEMA-certified connector.

In some embodiments, device 100 includes a housing having a footprint and/or form factor approximating that of a standard one-gang electrical box so that device 100 can be installed over or in place of an existing wall plate and then provide similar functionality, appearance, and/or form factor as the underlying electrical outlet.

Inverter 106 is an electronic device or circuitry that changes direct current (DC) to alternating current (AC). Inverter 106 can be in communication with one or more DC power sources 126 such as batteries. When activated through switch 116, inverter 106 receives DC power through input 118 and outputs AC power through outlet 120.

Suitable inverters can be selected based on the DC power source 126 and the line voltage to be used. For example, if DC power source 126 is one or more 12 V batteries and line power 122 is 120 V, a 2,000 Watt continuous, 4,000 Watt peak inverter will be acceptable.

DC power sources 126 can include one or more rechargeable or non-rechargeable power sources. Exemplary DC power sources include batteries (e.g., marine batteries), flywheels, solar cells, fuel cells, and the like. A plurality of DC power sources (e.g., 2, 3, 4, 5, 6, 8, 12, and the like) can be wired in series or parallel.

DC transformer 108 transfers energy from line power received via input 102 into DC power to recharge DC power source 126. For example, transformer can be a 120 V to 12 V, 1 amp DC transformer.

Relays 110, 112, 114 are switches that utilize electric current to generate a magnetic field to turn on or off a load. Relays 110, 112, 114 control the flow of power to line power output 104 and DC transformer 108 and operation of inverter 106 depending on whether line power is received by line power input 102.

If line power is received from line power input 102: the first relay 110 is adapted and configured to electrically couple the line power input 102 to the line power output 104; the second relay 112 is adapted to deactivate the inverter 106 via switch 116; and the third relay 114 is adapted to electrically couple the DC transformer 108 to the one or more DC power sources 126.

If line power is interrupted: the first relay 110 is adapted and configured to electrically couple the inverter 106 to the line power output 104; the second relay 112 is adapted to activate the inverter 106; and the third relay 114 is adapted to disconnect the DC transformer 108 from the one or more DC power sources 126.

A variety of relays can utilized. For example, first relay 110 and third relay 114 can be 120V, 10-15 amp double pole, single throw (DPDT) power relays. Second relay 112 can be a 120V, 3-6 amp single pole, single throw (SPST) power relay.

The inclusion of third relay 114 advantageously prevents or reduces draining of the DC power sources 126 when line power is interrupted. When line power is present, the third relay 114 the DC transformer 108 provides power to charge DC power sources 126. However, if the DC transformer 108 is still coupled to the DC power sources 126 when line power is lost, the DC transformer 108 will become a load and increase drain on the DC power sources 126.

Figure 2A:
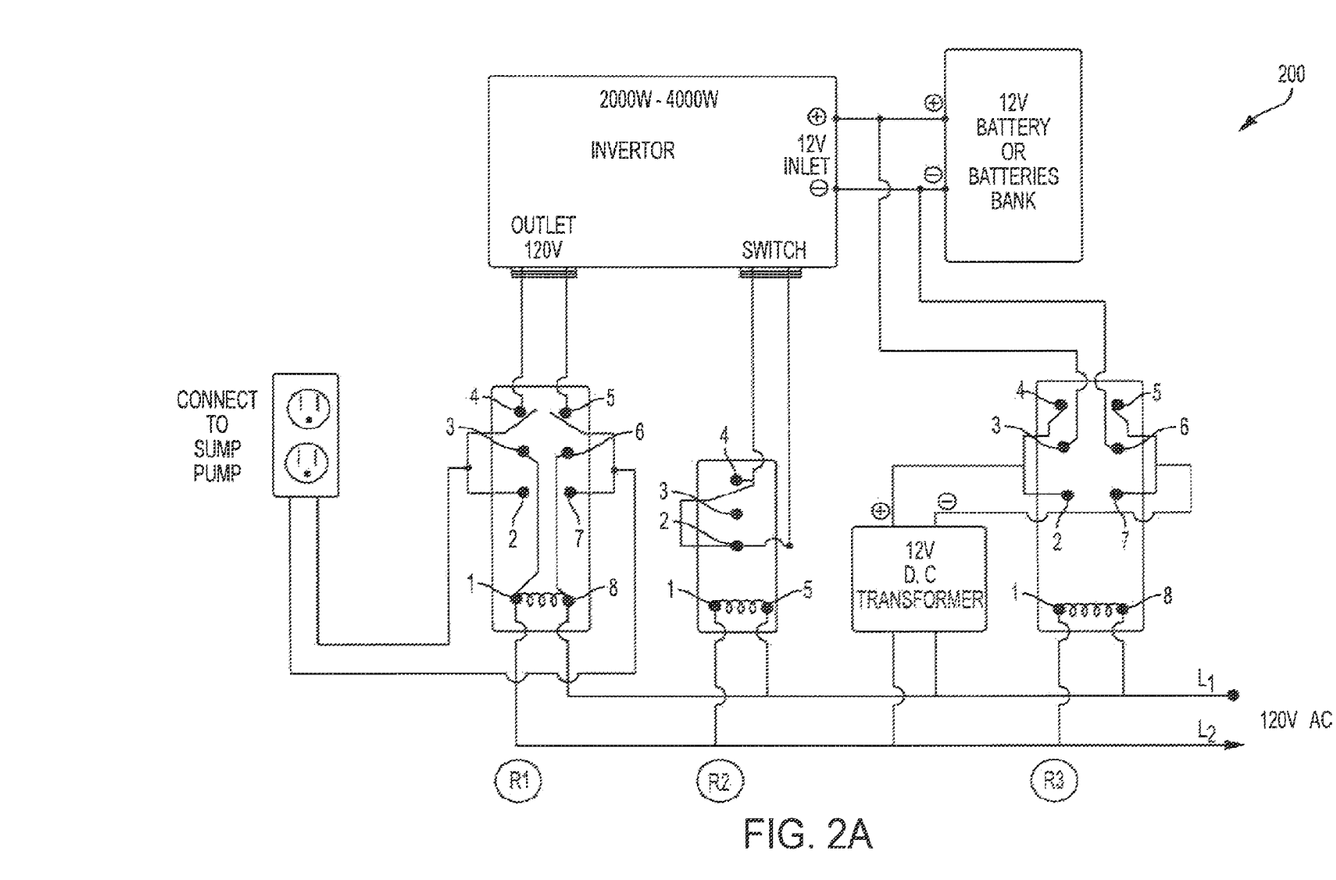
FIGS. 2A-2C depict an exemplary device 200 according to an embodiment of the invention.

Referring now to FIG. 2A, another exemplary device 200 is depicted in greater detail than in FIG. 1. Namely, exemplary pin configurations of relays are depicted. Device 200 can be constructed as follows.

On first relay switch R1: (a) use wire to connect pin 3 to pin 1; (b) use wire to connect to pin 6 to pin 8; (c) connect pin 1 to line L1; (d) connect pin 8 to line L2; (e) connect pin 2 to one side of outlet; (f) connect pin 7 to other side of outlet; and (g) connect pin 4 and pin 5 to inverter's 120V outlet.

On the second relay switch R2, connect pin 1 to line L1 and connect pin 5 to line L2.

Identify the two wires connected to the inverter's ON-OFF switch. Once found, connect the second relay switch R2's pin 2 and pin 4 to the two solder spots at the switch. Leave pin 3 unconnected.

On the third relay switch R3: (a) connect pin 1 to line L1; (b) connect pin 8 to line L2; (c) connect pin 2 to the positive end of the transformer; (d) connect pin 7 to the negative end of the transformer; (e) connect pin 3 to positive terminal of battery; (0 connect pin 6 to negative terminal of battery; and (g) leave pins 4 and 5 unconnected.

Connect transformer to lines L1 and L2 via outlet, hard wire, or bus.

Connect the battery's positive terminal to inverter's positive inlet and connect the battery's negative terminal to inverter's negative inlet.

Figure 2B:
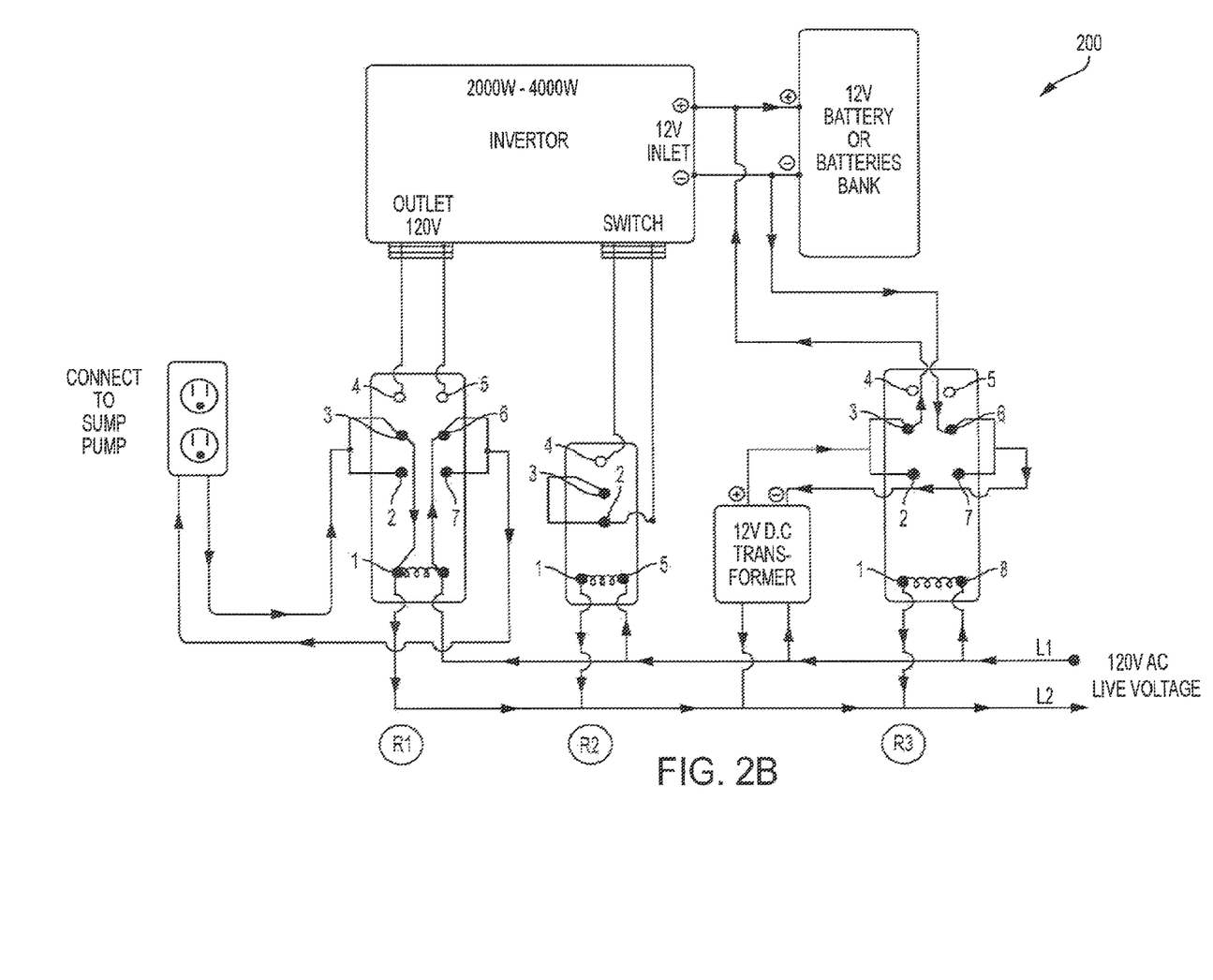
Figure 2C:
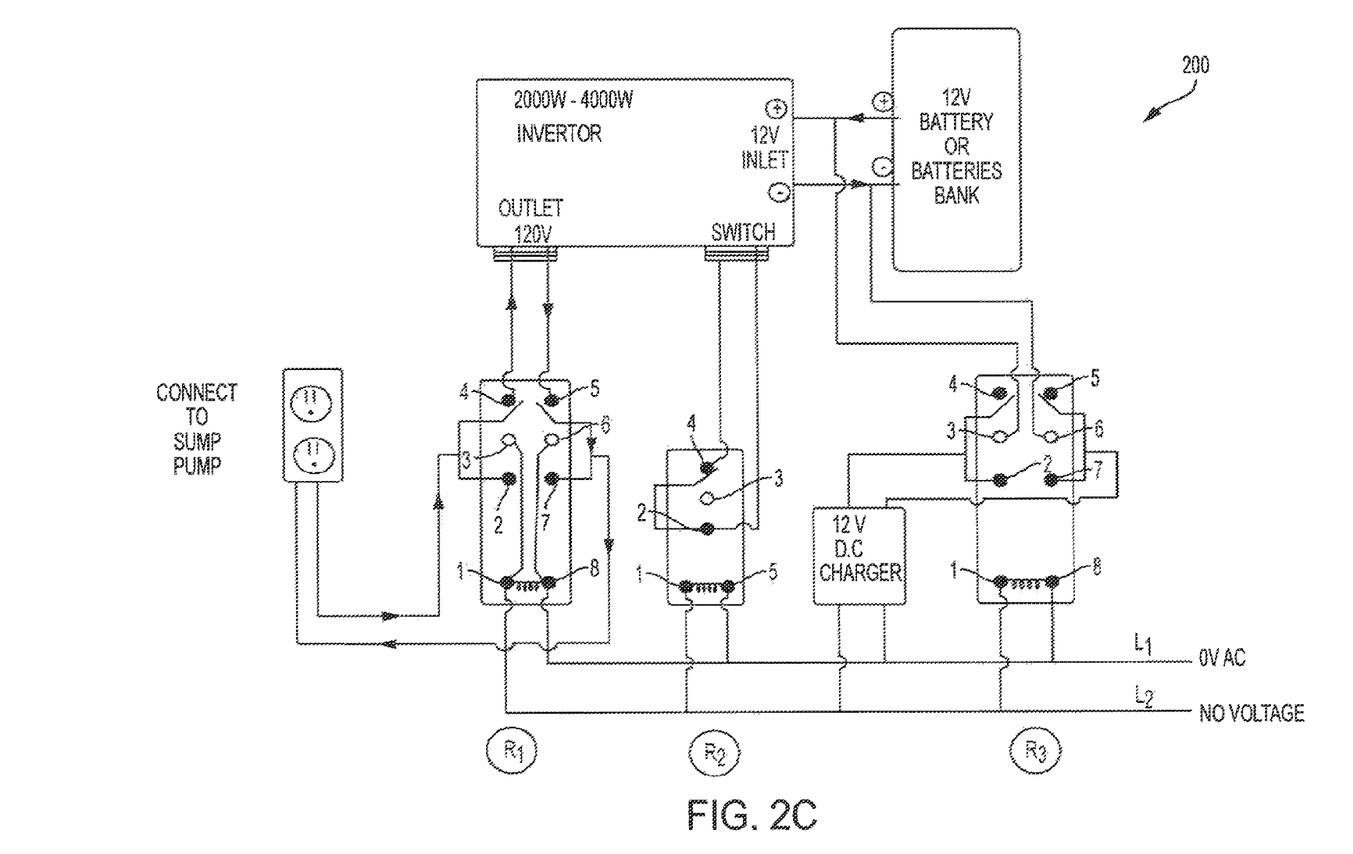

The operation of device 200 when line power is available and unavailable is depicted in FIGS. 2B and 2C, respectively.

When line power is available, all relay switches receive electric current and the magnetic fields are energized for all relay switches.

In the first relay switch R1, the magnetic field causes pins 2 and 3 as well as pins 7 and 6 to make contact and connect to lines L1 and L2 so that electric current flows through pins 2 and 7. As a result, line power is present at the outlet port and the sump pump runs.

The second relay switch R2 acts as remote ON-OFF switch for the inverter when relay R2 is energized. The magnetic field pulls pins 2 and 3 into contact. However, pin 3 is unconnected, so the inverter is switched OFF.

In the third relay switch R3, the magnet field pulls pins 2 and 3 and pins 6 and 7 into contact. Because pins 3 and 6 are connected to the positive and negative terminals of the battery, and pins 2 and 7 are connected to the positive and negative terminals of transformer, the battery is charging.

The transformer is either plugged-in to an electrical outlet or hard wired to lines L1 and L2 and charges the battery when live voltage applied.

When line power is lost, all relay switches lose electric current, the magnetic fields disappear, and all pins will fall back to their original position.

At third relay switch R3, pins 2 and 4 and pins 7 and 5 are reconnected. Because pins 4 and 5 are unconnected, the battery is not charging and also not draining energy.

At second relay switch R2, pins 2 and 4 are reconnected. Pins 2 and 4 are connected to the inverter's ON-OFF switch. The inverter is turned ON, regardless of the position of the inverter's switch.

At the first relay switch R1, pins 2 and 4 and pins 7 and 5 are reconnected. Because W pins 3 and 4 are connected to inverter's outlet, 120V electric current flows from inverter from pin 4 to pin 2 and from pin 5 to pin 7 in order to reach outlet and power sump pump.

Figure 3:
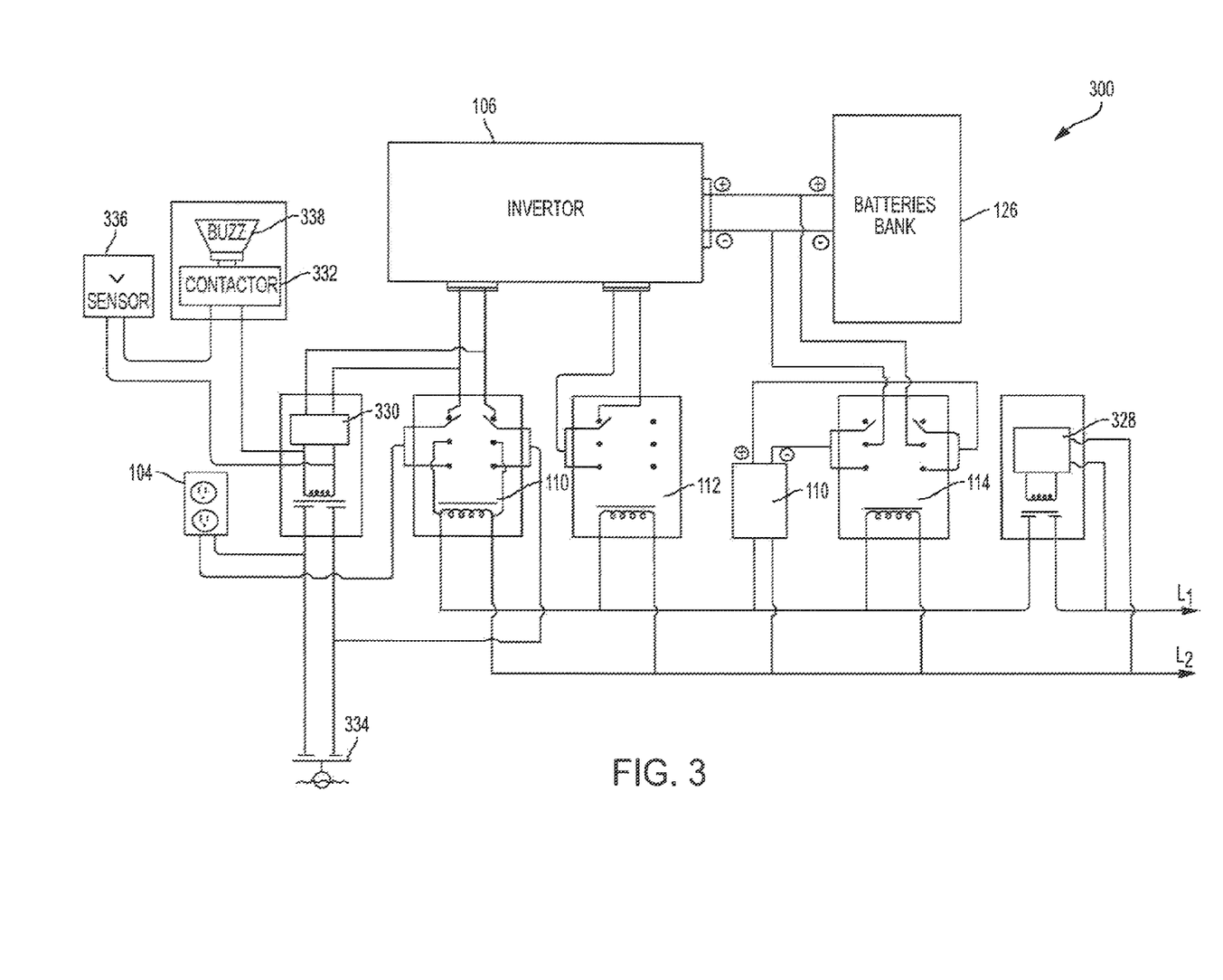
FIG. 3 depicts an exemplary device 300 according to an embodiment of the invention.

Referring now to FIG. 3, another exemplary device 300 is depicted. Device 300 can include the same or similar components as discussed in the context of the devices 100, 200 described and depicted in the context of FIGS. 1-2C. Descriptions of such devices are omitted in the interest of efficiency.

System 300 further includes a first timer 328, a second timer 330, a contactor 332, a float switch 334, a vibration sensor 336, and an alarm 338.

First timer 328 is normally in the closed position, permitting electricity from line power 122 to energize system 300. First timer 328 is adapted, configured, and/or programmed to periodically interrupt the flow of electricity to the system 300, thereby causing the system to enter backup mode as described in the context of the devices 100, 200 described and depicted in the context of FIGS. 1-2C.

Second timer 330 can be adapted, configured, and/or programmed to periodically complete a circuit and bypass the float switch 334, which will normally be in an open position in the sump pit is dry. Contactor 332 (or a relay) is energized, as is the line power output 124 to which the sump pump is connected. Second timer 330 can close its circuit for a pre-defined period of time. When the pump runs, it generates vibration that is detected by vibration sensor 336 (e.g., an electromechanical or piezoelectric sensor) that can be placed on any surface in mechanical communication with the pump or other controlled device (e.g., on a drain pipe coupled to a pump). If vibration is detected, the sensor 336 opens the contactor 332 (which is connected to the second timer circuit) and the alarm 338 will not be activated. However, if vibration is not detected, the contactor 332 will be closed and the alarm 338 will be activated to alert the user that the pump is not functioning properly.

First timer 328 and second timer 330 can be adapted, configured, and/or programmed to perform the functions described above at one or more pre-defined and/or user-defined intervals and durations that may be the same, different, synchronous, or offset. For example, the first timer 328 and second timer 330 can be user-programmable (e.g., through a user interface, remote control via a computer or smartphone, and the like). Exemplary intervals include about 1 day, about 1 week, and the like. Exemplary durations include about 1 second, about 2 seconds, about 3 seconds, about 4 seconds, about 5 seconds, about 15 seconds, about 30 seconds, about 1 minute, about 2 minutes, about 3 minutes, about 4 minutes, about 5 minutes, and the like. In some embodiments, the interval and duration can be set (either during design, manufacture, or both the user) based on recommendations from the manufacture of DC power source 126. Shorter durations (e.g., about 4 seconds) may be preferred for the second timer 330 in order to prevent or minimize damage to a pump due to dry runs.

As discussed herein, embodiments of the invention can be applied to a variety of applications. In one embodiment, the system is utilized to power a system having intermittent power demands and power supplies. For example, submersible well pumps are often positioned far from a line power source, especially on farms. This distance increases the cost of installation and operation because increased transmission distances require heavier gauge electrical wire that is more expensive and voltage drops caused by long distances cause premature pump motor failure. Embodiments of the systems described herein can be installed in proximity to a submersible well pump to collect, store, and dispense electricity generated by one or more solar panels optionally installed in proximity to the well.

WORKING EXAMPLES

Embodiments of the invention were tested using various sump pumps. In each test, a single battery 12 V deep cycle marine battery was fully charged at the start of the test and then discharged to the point that the pump failed to operate.

The test results are summarized in Table 1 below. Notably, a run time approaching that of the GOULD® SPBB Battery Backup Sump Pump was achieved using a GOULDS® STS31V AC pump having double the pumping volume and without the need to purchase a second pump that may be undersized.

TABLE 1

| | \multicolumn{5}{c}{Sump Pump Model} | | | | |
|---|---|---|---|---|---|
| | ZOELLER® M53 (⅓ HP, 115 V, 9.7 Amps AC) | GOULDS® STS31V (⅓ HP, 115 V, 4.5 Amps AC) | STARITE® DC233V (⅓ HP, 115 V, 9.8 Amps AC) | STARITE® D12518V (¼ HP, 115 V, 9.8 Amps AC) | GOULDS® SPBB (N/A, 12 V, 8.5 Amps DC) |
| \multicolumn{6}{c}{Running Time with 1 Battery} | | | | | |
| @ 10' Head | 5 hr 50 min | 9 hr 45 min | 4 hr 48 min | 3 hr 44 min | 10 hr 20 min |
| @ 15' Head | 3 hr 20 min | 5 hr 30 min | 2 hr 36 min | 2 hr 10 min | N/A |
| \multicolumn{6}{c}{Additional Pumping Stats @ 10' Head} | | | | | |
| Volume | 34 GPM | 30 GPM | 40 GPM | 30 GPM | 15 GPM |
| Cycle Interval | 55 sec | 75 sec | 75 sec | 65 sec | 75 sec |
| Pump Running Time | 5 sec | 5 sec | 5 sec | 10 sec | 40 sec |
| \multicolumn{6}{c}{Additional Pumping Stats @ 15' Head} | | | | | |
| Volume | 21 GPM (14' Head) | 24 GPM | 29 GPM (14' Head) | 14 GPM (14' Head) | N/A |
| Cycle interval | 35 sec | 34 sec | 41 sec | 41 sec | N/A |
| Pump Running Time | 10 sec | 8 sec | 8.7 sec | 14 sec | N/A |
| Number of Cycles on 1 Battery | 261 | 594 | 183 | 158 | N/A |

EQUIVALENTS

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules and the like) shown as distinct for purposes of illustration can be incorporated within other functional elements, separated in different hardware, or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

What is claimed is:

1. A power management device comprising:
   a line power input;
   a line power output;
   an inverter in communication with one or more DC power sources, the inverter adapted and configured to receive DC power from a DC power source and output line power;
   a DC transformer in communication with the line power input, the DC transformer adapted and configured to change line power to DC power;
   a first relay;
   a second relay;
   a third relay;
   a sump pump;
   a first timer programmed to periodically interrupt a flow of electricity from the line power input;
   a second timer programmed to periodically cause the sump pump to run regardless of whether a float switch is triggered;
   a sensor programmed to detect whether vibrations indicative of operation of the sump pump occur; and
   an alarm programmed to generate an alert if the sensor does not detect vibrations when the second timer periodically causes the sump pump to run;
   wherein:
      if line power is provided via the line power input:
         the first relay is adapted and configured to electrically couple the line power input to the line power output;
         the second relay is adapted to deactivate the inverter; and
         the third relay is adapted to electrically couple the DC transformer to the one or more DC power sources; and
      if line power is not provided via the line power input:
         the first relay is adapted and configured to electrically couple the inverter to the line power output;
         the second relay is adapted to activate the inverter; and
         the third relay is adapted to disconnect the DC transformer from the one or more DC power sources.

2. The power management device of claim 1, wherein the line power input includes a plug adapted and configured for removable coupling with an electrical receptacle.

3. The power management device of claim 2, wherein the plug is NEMA-compliant.

4. The power management device of claim 1, wherein the line power input includes an appliance coupler or an interconnection coupler.

5. The power management device of claim 4, wherein the appliance coupler or the interconnection coupler are IEC-60320-compliant.

6. The power management device of claim 1, wherein the line power output is an electrical receptacle.

7. The power management device of claim 6, wherein the electrical receptacle is NEMA-compliant.

8. The power management device of claim 1, further comprising:
a housing.

9. The power management device of claim 8 wherein the housing has a profile substantially approximating a one-gang electrical box.

10. The power management device of claim 1, wherein the inverter is a 2,000 Watt continuous, 4,000 Watt peak inverter.

11. The power management device of claim 1, wherein the one or more DC power sources include one or more batteries.

12. The power management device of claim 1, wherein the one or more batteries are 12 Volt batteries.

13. The power management device of claim 12, wherein the one or more DC power sources include one or more selected from the group consisting of: flywheels, solar cells, and fuel cells.

14. The power management device of claim 1, wherein the line power is 120 Volt.

15. The kit of claim 1, wherein the one or more DC power sources include one or more batteries.

16. The kit of claim 15, wherein the one or more batteries are 12 Volt batteries.

17. The kit of claim 1, wherein the one or more DC power sources include one or more selected from the group consisting of: flywheels, solar cells, and fuel cells.

\* \* \* \* \*